United States Patent [19]
Clark et al.

[11] Patent Number: 5,890,422
[45] Date of Patent: Apr. 6, 1999

[54] CONVERTIBLE DRIP PAN AND METHOD OF USING THE SAME

[75] Inventors: Gilbert D. Clark, Cary; John G. Mills, Wake Forest; Preston Stogner, Cary, all of N.C.

[73] Assignee: Grill-N-Roast, Inc., Cary, N.C.

[21] Appl. No.: 668,747

[22] Filed: Jun. 24, 1996

[51] Int. Cl.⁶ .................................................. A47J 37/07
[52] U.S. Cl. ............................... 99/447; 99/446; 99/400; 99/401
[58] Field of Search ........................... 99/447, 446, 400, 99/401

[56] References Cited

U.S. PATENT DOCUMENTS

| | | | |
|---|---|---|---|
| 2,985,097 | 5/1961 | Nevin et al. | 99/447 |
| 4,750,469 | 6/1988 | Biggs | 99/447 X |
| 4,909,137 | 3/1990 | Brugnoli | 99/400 X |
| 5,313,877 | 5/1994 | Holland | 99/446 |

*Primary Examiner*—Reginald L. Alexander
*Attorney, Agent, or Firm*—Mills & Assoc.

[57] ABSTRACT

This invention is a barbecue type grill that can be used either indoors or outdoors. By diposing a convertible drip pan that can be opened and closed between the food supporting rack and the cooking heat source, rapid preheating can be accomplished as well as searing of desired food products, followed by closing of the drip pan to prevent unwanted flare-ups caused by juices dripping from the food being cooked. This closing of the drip pan allows the food to cook slower than over direct heat which allows the food to retain more juices when done. This invention overcomes the slow preheating and slow initial cooking inherent in the prior art using a solid impervious drip pan. Also, since different types of heat sources can be used in conjunction with the present invention, the problem of the bottom of the housing rusting out in the area adjacent the round burner below the heat deflecting plate is effectively eliminated.

10 Claims, 6 Drawing Sheets

CONVERTIBLE DRIP PAN AND METHOD OF USING THE SAME

FIELD OF INVENTION

This invention relates to cooking methods and apparatuses and more particularly to grill type cooking devices.

BACKGROUND OF INVENTION

The art of cooking has been around since the earliest days of the human race. This includes both indoor and outdoor preparation of foods utilizing heat to cook the same. In more recent times, Hibachis have been used for both indoor and outdoor cooking while charcoal and gas grills have been used primarily for outdoor cooking, and jen-aire and other electric and gas fired units with ventilating systems are used for indoor cooking. One problem universally encountered when cooking food products that have excessive juices, particularly meats, is that such juices catching on fire and burning such products.

People have become accustomed to seared steaks, hamburgers and the like but do not want the same charred. Brown on the outside and juicy on the inside is the usual order of the day. The problem is how to sear products the desired amount and yet prevent further flame contact which could over cook or char the same. Also, when cooking food products such as poultry, including chickens, turkeys, and the like, flare ups are very undesirable and yet adequate heat must be available to cook the product and brown the outside thereof.

In recent years, at least one barbecue device has been developed that eliminates during the cooking process. This gas grill, however, is extremely slow to heat up to cooking temperature and is slow to complete the cooking process even on relatively small pieces of meat or other food products. Also extremely high temperatures are encountered in the burner area during the entire cooking process. It is touted that this grill has no controls, just "on" and "off", but the reason for this is that the cooking temperature in the area of the food product is barely adequate to cook the same and any reduction in heat would give unsatisfactory results.

CONCISE EXPLANATION OF PRIOR ART

U.S. Pat. Nos. 4,773,319 and 5,313,877 to Robert D. Holland both relate to the same grill and both disclose a barbecue grill with controlled heat distribution including a drip pan that covers substantially the entire horizontal area of the cooker so that grease and other drippings can be removed from the cooker without coming in proximity to burner flame which could ignite the same. The heat below the drip pan in the enclosed area where the burner is located reaches such a high elevated temperature that a heat deflecting shield must be placed over the burner to prevent hot spots and gum up of the juices dripping from the cooking food product into the drip pan. Also, due to the high temperatures in the burner chamber, rust outs of the lower housing occur in a relatively short period of time.

BRIEF DESCRIPTION OF INVENTION

After much research and study into the above mentioned problems, the present invention has been developed to provide a grill type cooking device that can be used, either indoors or outdoors. This cooking apparatus allows the same to be preheated to cooking temperature in a matter of minutes. Steaks and other food products can then be easily seared on the exterior to the desired amount followed by converting the apparatus to a flameless grill for completion of the cooking process. Also, the cooking process can be achieved through zone cooking. An example of this is poultry products can be cooked in a flare-up free environment in one zone while steaks and other food products can be seared in another zone of the same cooking apparatus.

The above is accomplished through the use of a drip pan disposed between the burners and the grill supporting the food products that can be opened for fast preheat and searing of food products and can then be closed down for the final cooking process. The present invention can also be opened up for preheating and then closed for normal cooking without searing or the danger of flare ups regardless of the amount of juices expelled by the food product being cooked.

In view of the above, it is an object of the present invention to provide a convertible drip pan that can be used in conjunction with both indoor and outdoor grill type cooking devices.

Another object of the present invention is to provide a drip pan with a plurality of cooking zones that can be opened and closed as desired.

Another object of the present invention is to provide, in a grill type cooking device that has an enclosed lower housing, a lid, a cooking heat source and a rack for supporting food products, a convertible drip pan that can be opened for preheating and searing and can be closed for flare-up free cooking.

Another object of the present invention is to provide a convertible drip pan that can be used in conjunction with several different types of cooking heat sources.

Other objects and advantage of the present invention will become apparent and obvious from a study of the following description and the accompanying drawings which are merely illustrative of such invention.

DETAILED DESCRIPTION OF INVENTION

Figure 1:
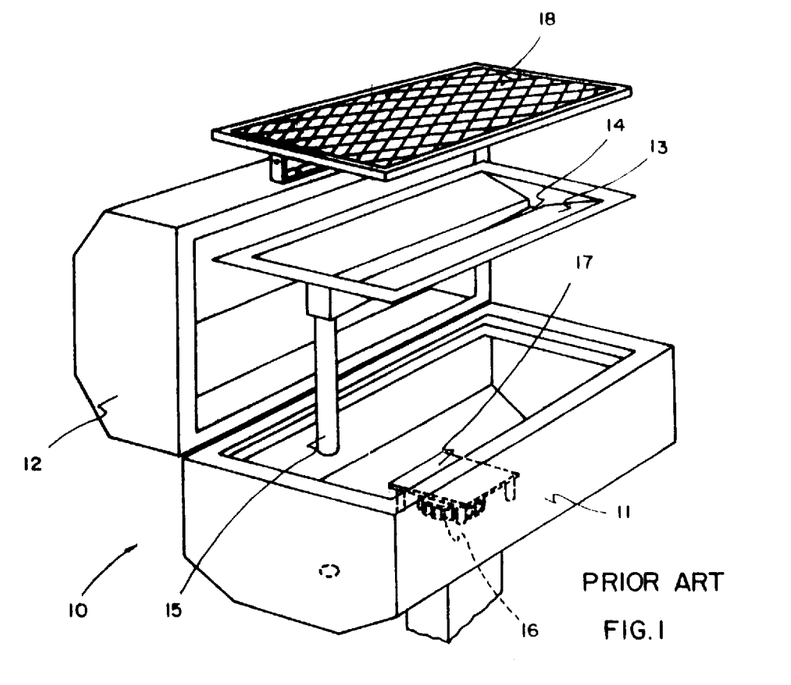
FIG. 1 is an exploded perspective view of the prior art drip pan disposed between the heat source and rack that supports food to be cooked.

With further reference to the drawings, the prior art cooker, indicated generally at 10, includes a lower housing 11 and a hinged hood 12. A drip pan 13 that covers substantially the entire upper opening in housing 11 has a sloped central trough with a drain tube 15 connected to the lower end of such trough. This drain tube is designed to take drippings from the food being cooked to the outside of the grill housing. A food supporting rack 18 is disposed above the drip pan 13.

The prior art discloses a round gas burner 16 as a heat source. This burner is centrally located in the bottom of lower housing 11. Since this type of burner concentrates such as large amount of heat in a relatively small area, a heat deflecting plate 17 must be placed over the burner 16 to prevent grease and other drippings from coagulating and burning in the area of the drip plan immediately above such burner.

Although the prior art cooker 10 does slow cook food products to being done without excessively drying out of the same, there are inherent disadvantages in this design.

First, the drip pan 13 covers almost the entire area below the rack 18, so the heat from the round burner 16 that reaches such rack for cooking purposes is marginal. This causes the food on the rack 18 to take a long time to cook which can be very inconvenient.

In addition to the long cooking time, the preheating of the cooker 10 prior to putting the food on the rack 18 is excessively long, the recommended time being thirty minutes.

Also, because the burner 16 must generate substantially more heat during preheating and cooking than is required in a standard grill of this type without a solid drip pan, fuel consumption is substantially greater.

A further problem encountered with the prior art grill shown in FIG. 1 is that high temperatures are encountered in the area around the burner 16. Experience has shown that these high temperatures can cause premature rust out of the bottom of housing 11, quite often rendering the grill not only unsafe, but inoperable, within two to three years.

The present invention, indicated generally at 19, is a convertible drip pan that can be opened to allow rapid preheating of the cooker, normally ten minutes or less, followed by allowing flame ups from dripping juices to sear the exterior of food products such as steaks and the like. The present invention can then be closed to prevent further flare ups and to allow the cooking process to be completed.

For food products that are not desired to be seared, such as poultry and large pieces of meat, the drip pan of the present invention can be opened during preheating and closed during cooking to greatly decrease the overall cooking time while providing the same juicy end product as the prior art grill without flare-ups.

Figure 2:
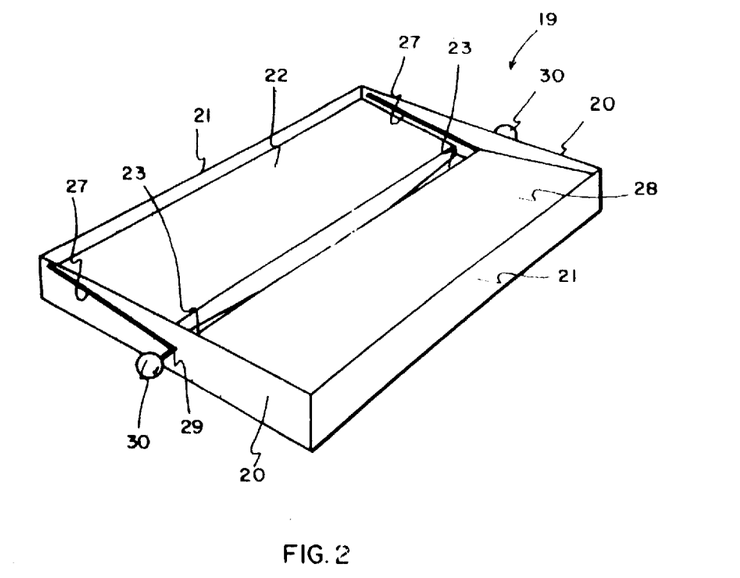
FIG. 2 is a perspective view of the improved drip pan of the present invention in closed flameless position.
Figure 3:
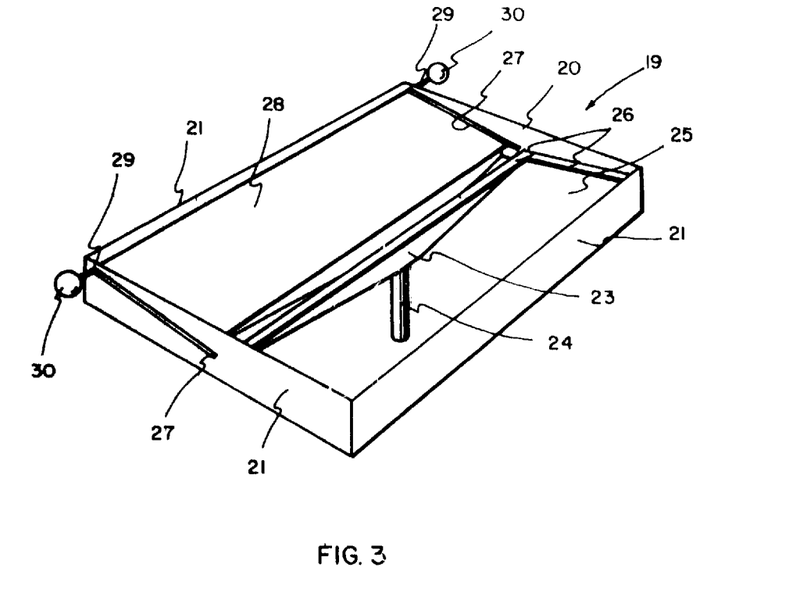
FIG. 3 is a perspective views of the improved drip pan in open position.

In the embodiment of the present invention show in FIGS. 2 and 3, a rectangular housing is provided with end walls 20 and side walls 21. A fixed inwardly sloping planer surface 22 is mounted between end walls 20 and one of the side walls 21. An inwardly sloping trough 23 extends between the end walls 20 and the interior edge of planer surface 22 with a drain tube 24 communicatively connected to the central portion thereof which is the lowest point in such trough.

On the side of trough 23, opposite planer surface 22, is an opening 25 having a lip 26 about the periphery of such opening.

Elongated slots 27 are provided in end walls 20 just above and parallel the juncture between planer surface 22 and said side walls. A movable planer surface 28 is so sized to rest on peripheral lip 26 of opening 25. Arms 29 are attached to and outwardly extend through elongated slots 27 from opposite ends of movable planer surface 28. Heat resistant knobs, made of ceramics or other suitable material, are mounted on the outer ends of each of the arms 29.

From the above it can be seen that when the movable planer surface 28 is in the position shown in FIG. 2, the opening 25 in such pan will be closed; and when the planer surface 28 is moved, by manipulating knobs 30, to the position shown in FIG. 3, the opening 25 is exposed so that flare ups can rise therethrough. Thue a flare up free zone drippings can drop downwardly therethrough and heat and is provided as well as a second zone for preheating and searing.

Figure 4:
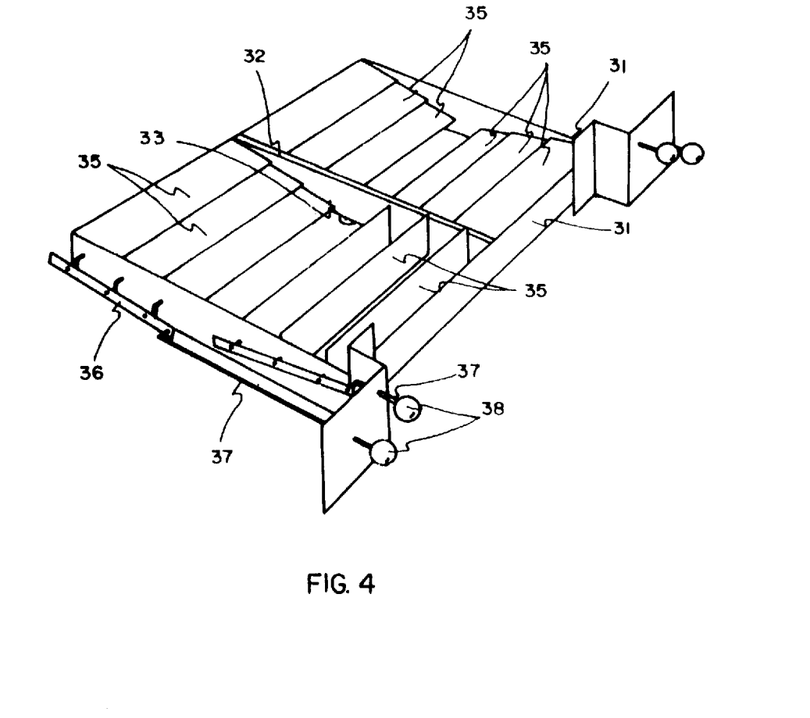
FIG. 4 is a perspective view of the improved drip pan having four openable zones.
Figure 5:
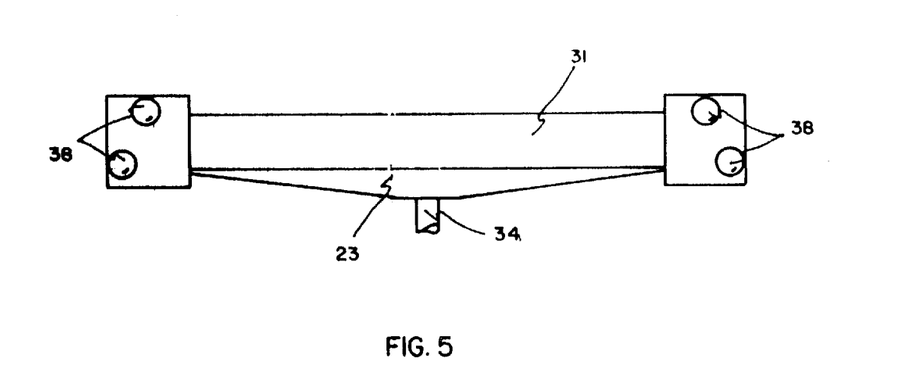
FIG. 5 is a front elevational view of the improvement shown in FIG. 5, illustrating the centrally disposed drain tube.

The version of the convertible drip pan 19 of the present invention shown in FIG. 4 has four cooking zones using pivotal closures rather than sliding closures. A peripheral shutter frame 31 is provided with a central dividing frame 32. An inwardly sloping trough , similar to trough 23, extends across the shutter frame 31 with a central drain opening 33 below dividing frame 32 that communicates to centrally disposed drain tube 34.

The pivotable shutter vanes 35, when closed, overlap with the lower edge of the upper vanes lying juxtaposed to the upper edges of the lower vane as can clearly be seen in FIG. 4. Tie rods 36 are operatively connected, through the ends of shutter frame 31, to the adjacent pivotal vanes 35. Each of these tie rods has a manipulating arm operatively attached thereto at one end and terminates in a heat resistant knob 38. Since the mounting and operation of shutter frames, pivotal vanes, tie rods and manipulating arms are all well known to those skilled in the art, further detailed description of this portion of the present invention is not deemed necessary.

When the convertible drip pan of the present invention is used in conjunction with an outdoor type grill or barbecue, a housing such as that indicated at 39 would be provided. This housing has front and rear walls 40 and 41, side walls 42 and a bottom 43. This bottom 43 can either be of the pullout type to make cleaning easier, or can be permanently affixed. In either case, a central opening is provided in the bottom to allow the drain tube to pass from the bottom of the convertible drip pan to the exterior of housing 39.

Figure 6:
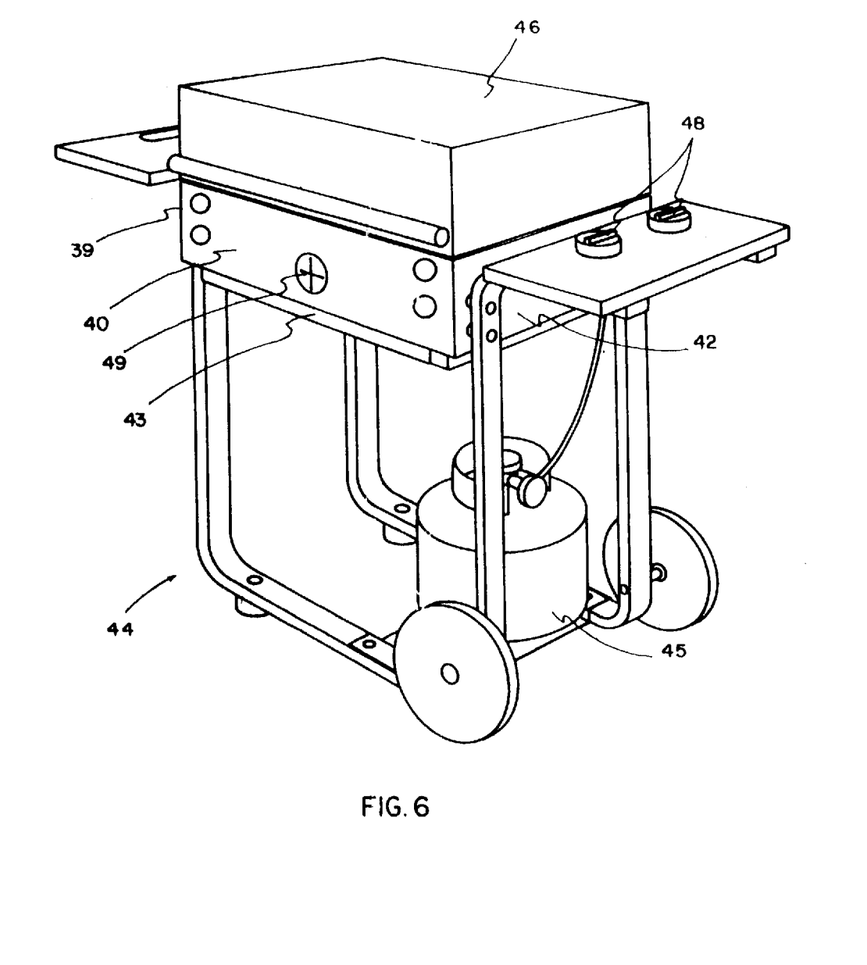
FIG. 6 is a front perspective view of a typical enclosure into which the present invention can be incorporated.
Figure 7:
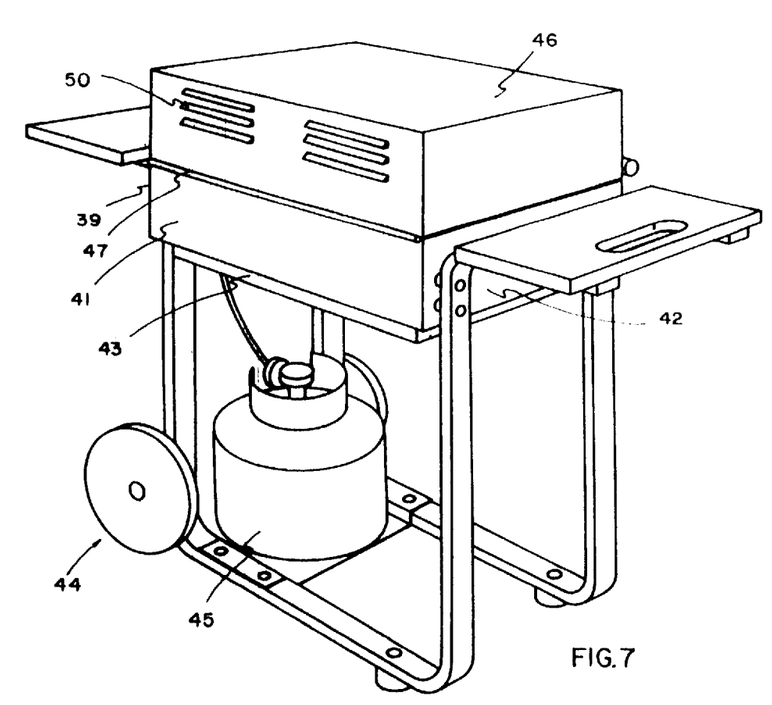
FIG. 7 is a rear perspective view, of said enclosure.

A supporting under carriage, indicated generally at 44, can be either of the type shown in FIGS. 6 and 7, or any other suitable configuration.

If the cooking heat source is one or more propane type gas burners, then a propane tank 45 can be appropriately furnished. If natural gas or electrical cooking heat sources were used, then appropriate connections (not shown) will provided.

In the type of grill shown in FIG. 6 and 7, control knobs 38 are operatively mounted on the front wall 40 of housing 39 so that the zones in the convertible drip pan 19 can be opened and closed.

A lid 46 is secured to rear wall 41 of housing 39 by suitable means such as hinge 47.

Burner control knobs 48 are conveniently mounted on the grill and an air control damper 49 can be provided in the front wall 40 of housing 39 with exhaust ports 50 provided in the rear of lid 46. The location and configuration of dampers, exhaust ports and the like, can of course vary depending on the specific needs of the unit produced.

Figure 8:
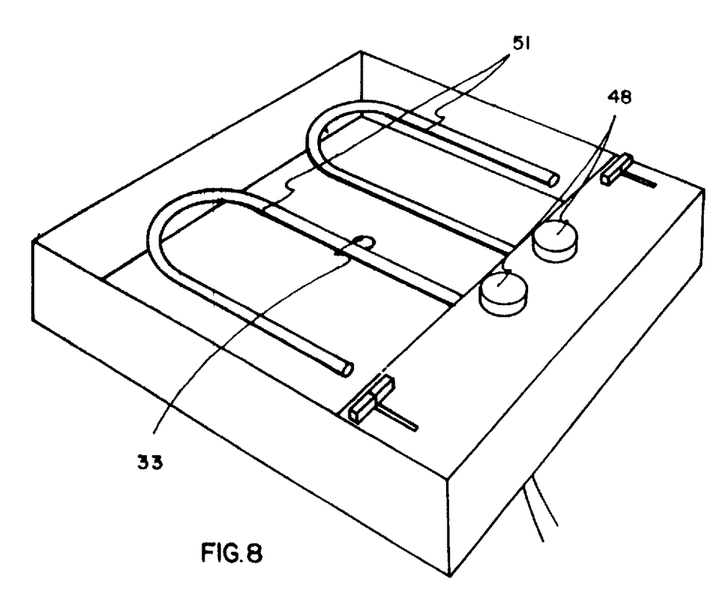
FIG. 8 is a perspective views showing one type of heat source used in conjunction with the present invention.

The drip pan of the present invention, having a plurality of convertible cooking zones, can be used in conjunction with several different sources of cooking and searing heat. FIG. 8 discloses electrical heating elements 51 with operatively associated control knobs 48'. When these heating elements become red hot and one or more of the zones in the convertible drip pan 19 are opened, searing of the meat or other food product resting on the rack above the pan can be readily accomplished.

Figure 9:
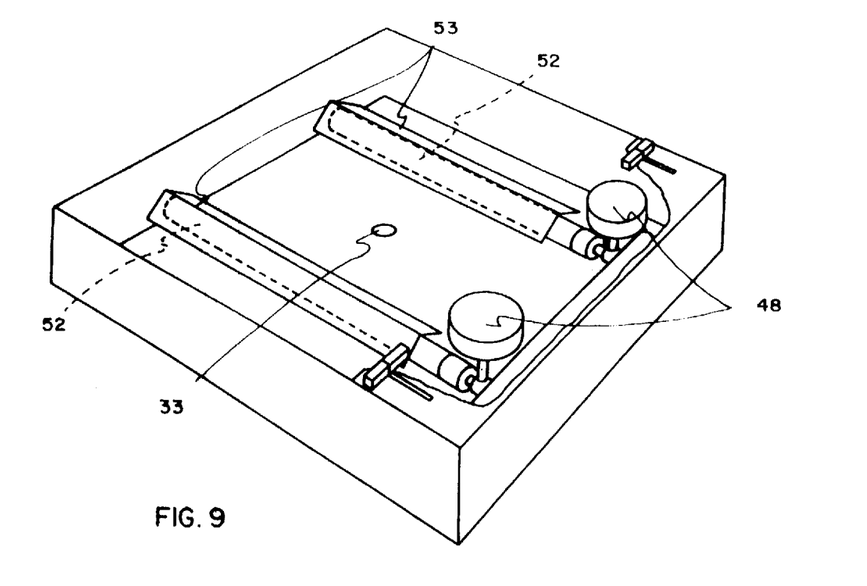
FIG. 9 is a perspective view of another type of heat source used in conjunction with the present invention.

FIG. 9 discloses a plurality of elongated gas type burners 52 with associated control knobs 48. Inverted deflector shields 53 can be provided so that any juices dripping on the burners,.will not tend to stop up the burner orifices. Deflector shields of this type are well known to those skilled in the art and are incorporated in Webber Genisis Gas Grills as well as in other makes.

Figure 10:
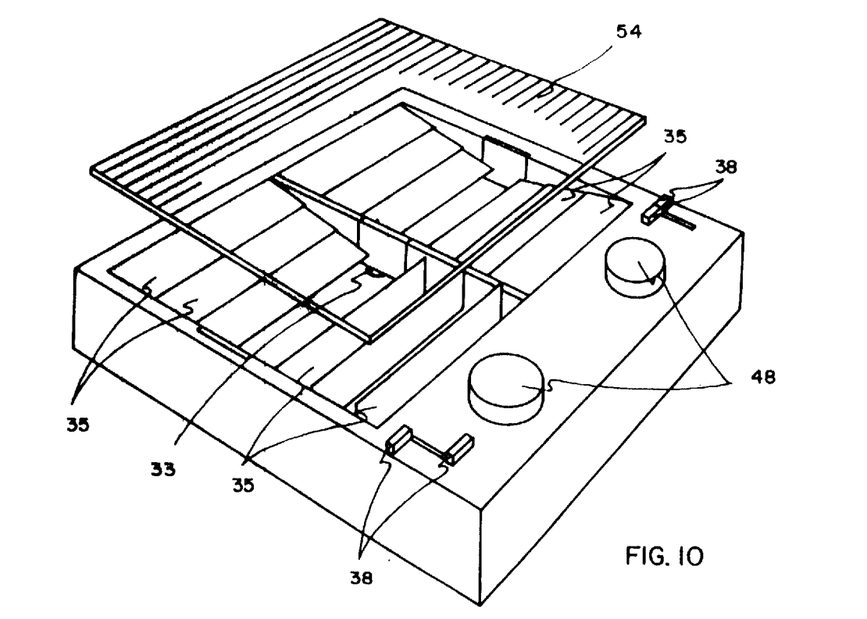
FIG. 10 is an exploded view of the drip pan of the present invention showing its relationship to the food supporting rack.

The exploded view shown in FIG. 10 shows the component parts of a typical grill incorporating the features of the present invention. The food supporting rack 54 can be of any suitable configuration from expanded metal to a plurality of closely spaced rods, to flat porcelain rods incorporated in the more expensive grills or barbecues.

From the above it can be seen that the present invention can be incorporated into any type of cooking environment where it is desired to control flare-ups during the cooking process. The present invention has all of the advantages of the prior art flameless grill or barbecue while overcoming all of the drawbacks thereof. With the present invention, pre-heating is quick, steaks and similar food products can be seared to the desired amount and poultry such as chickens can be cooked all the way through without flare-up.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A barbecue grill comprising: a housing enclosing a rack supporting food to be cooked and an ashless heat source for cooking,
   a convertible drip pan substantially covering the area below the food supporting rack; means for opening at least a portion of said convertible drip pan to allow heat from the heat source to rise therethrough to sear the food thereabove; means for closing the opening in at least a portion of said convertible drip pan; and means for collecting drippings from the food when the convertible drip pan is closed whereby food can be cooked in the same manner as a conventional barbecue grill when the drip pan is open and can slow cook in a flare-up free environment when such pan is closed.

2. The apparatus of claim 1 wherein the means for opening at least a portion of the convertible drip pan is a sliding plate.

3. The apparatus of claim 1 wherein the means for opening at least a portion of the convertible drip pan is at least one pivotable vane.

4. The apparatus of claim 1 wherein the means for opening at least a portion of the convertible drip pan is a plurality of pivotable vanes.

5. The apparatus of claim 1 wherein the means for opening at least a portion of the convertible drip pan is a plurality of pivotable vanes.

6. In an enclosed grill having an ashless heat source and a rack supporting food to be cooked disposed thereabove, the improvement comprising:
   a convertible drip pan disposed between the rack supporting food to be cooked and the ashless heat source for cooking the food, said convertible pan substantially covering the entire area below the food supporting rack; means for opening at least a portion of the convertible drip pan to allow heat from the heat source to rise therethrough to sear the food on the rack; means for closing the opening in at least a portion of the drip pan; and for collecting drippings from the food when the convertible drip pan is closed whereby food can be cooked in the same manner as a conventional enclosed barbecue grill when the drip pan is open and can slow cook such food in a flare-up free environment when such pan is closed.

7. The means of claim 6 wherein a means is provided for collecting drippings from the food when the convertible drip pan is closed.

8. The means of claim 7 wherein a means is provided for flowingly removing the collected drippings from the closed drip pan.

9. The apparatus of claim 6 wherein the means for opening at least a portion of the convertible drip pan is a sliding plate.

10. The apparatus of claim 6 wherein the means for opening at least a portion of the convertible drip pan is at least one pivotable vane.

* * * * *

UNITED STATES PATENT AND TRADEMARK OFFICE
CERTIFICATE OF CORRECTION

PATENT : 5,890,422
DATED : April 6, 1999
INVENTOR(S) : Gilbert D. Clark et al.

It is certified that error appears in the above-identified patent and that said Letters Patent is hereby corrected as shown below:

In the ABSTRACT, line 2, please change "diposing" to --disposing--.

Column 1, line 32, after "eliminates" please add --flare ups--.

Column 1, line 45, please change "Robert D. Holland" to --Robert B. Holland--.

Column 3, line 10, please change "as" to --a--.

Column 4, lines 8-12, please change "exposed so that flare ups can rise therethrough. Thue a flare up free zone drippings can drop downwardly therethrough and heat and is provided as well as a second zone for preheating and searing." to original wording --exposed so that drippings can drop downwardly therethrough and heat and flare ups can rise therethrough. Thus a flare up free zone is provided as well as a second zone for preheating and searing.--.

Column 4, line 48, after "will" please insert --be--.

UNITED STATES PATENT AND TRADEMARK OFFICE
CERTIFICATE OF CORRECTION

PATENT NO. : 5,890,422
DATED : April 6, 1999
INVENTOR(S) : Gilbert D. Clark et al.

It is certified that error appears in the above-indentified patent and that said Letters Patent is hereby corrected as shown below:

Column 6, line 28, after "and" please add --means--.

Signed and Sealed this

Twenty-eighth Day of September, 1999

*Attest:*

Q. TODD DICKINSON

*Attesting Officer*  *Acting Commissioner of Patents and Trademarks*